(12) United States Patent
Yang

(10) Patent No.: US 11,963,245 B2
(45) Date of Patent: Apr. 16, 2024

(54) IDENTIFIER UPDATE METHOD, APPARATUS, DEVICE AND SYSTEM, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 521 days.

(21) Appl. No.: 17/279,573

(22) PCT Filed: Oct. 12, 2018

(86) PCT No.: PCT/CN2018/110136
§ 371 (c)(1),
(2) Date: Mar. 24, 2021

(87) PCT Pub. No.: WO2020/073333
PCT Pub. Date: Apr. 16, 2020

(65) Prior Publication Data
US 2021/0400743 A1    Dec. 23, 2021

(51) Int. Cl.
*H04W 76/11*  (2018.01)
*H04L 5/00*  (2006.01)
(Continued)

(52) U.S. Cl.
CPC ........... *H04W 76/14* (2018.02); *H04L 5/0053* (2013.01); *H04W 8/26* (2013.01)

(58) Field of Classification Search
CPC ...... H01M 4/131; H01M 4/366; H01M 4/525; H01M 4/625; H01M 10/0525; H01M 2004/021; H01M 2004/028
See application file for complete search history.

(56) References Cited

U.S. PATENT DOCUMENTS 7,995,521 B2    8/2011  Sung
8,224,988 B2    7/2012  Kubota
(Continued)

FOREIGN PATENT DOCUMENTS

CN    101895922 A    11/2010
CN    102017780 A    4/2011
(Continued)

OTHER PUBLICATIONS

3GPP TSG-SA WG2 Meetng #150E e-meeting, S2-2202352 (Year: 2022).*
(Continued)

*Primary Examiner* — Faruk Hamza
*Assistant Examiner* — Abusayeed M Haque
(74) *Attorney, Agent, or Firm* — Syncoda LLC; Feng Ma

(57) ABSTRACT

An identifier update method includes: in the process of a first terminal sending data carrying a first identifier to a second terminal, the first terminal acquiring a second identifier, wherein the second identifier is used for updating the first identifier, and both the first identifier and the second identifier are used for identifying the first terminal; and the first terminal sending indication information to the second terminal, wherein the indication information is used for indicating that the second identifier carried in data subsequently sent by the first terminal to the second terminal is an update of the first identifier.

20 Claims, 8 Drawing Sheets

(51) Int. Cl.
  *H04L 61/5038* (2022.01)
  *H04W 8/26* (2009.01)
  *H04W 76/14* (2018.01)

(56) References Cited

U.S. PATENT DOCUMENTS

| | | | |
|---|---|---|---|
| 8,923,285 B2 | 12/2014 | Wentink | |
| 9,473,961 B2 | 10/2016 | Chen et al. | |
| 2001/0019554 A1* | 9/2001 | Nomura | H04L 45/502 370/392 |
| 2007/0121615 A1* | 5/2007 | Weill | H04L 45/308 370/389 |
| 2008/0137601 A1 | 6/2008 | Sung | |
| 2008/0209071 A1 | 8/2008 | Kubota | |
| 2009/0274173 A1 | 11/2009 | Wentink | |
| 2014/0093239 A1 | 4/2014 | Griswold et al. | |
| 2014/0334287 A1 | 11/2014 | Chen et al. | |
| 2015/0257187 A1* | 9/2015 | Kwon | H04W 72/04 370/329 |
| 2016/0344469 A1 | 11/2016 | Yi et al. | |
| 2017/0353819 A1* | 12/2017 | Yin | H04W 4/70 |
| 2018/0376304 A1* | 12/2018 | Cheng | H04W 4/40 |
| 2020/0029353 A1* | 1/2020 | Xu | H04W 72/21 |
| 2021/0298100 A1* | 9/2021 | Pan | H04L 1/1607 |

FOREIGN PATENT DOCUMENTS

| | | |
|---|---|---|
| CN | 102208938 A | 10/2011 |
| CN | 102843223 A | 12/2012 |
| CN | 103259876 A | 8/2013 |
| CN | 103348748 A | 10/2013 |
| CN | 105940622 A | 9/2016 |
| WO | 2009086691 A1 | 7/2009 |

OTHER PUBLICATIONS

3GPP TSG-SA2 Meeting#149E (e-meetng), S2-2200543 (Year: 2022).*

International Search Report in the international application No. PCT/CN2018/110136, dated May 5, 2019.

English translation of the Written Opinion of the International Search Authority in the international application No. PCT/CN2018/110136, dated May 5, 2019.

First Office Action of the Chinese application No. 201880001632.6, dated Mar. 3, 2021.

Supplementary European Search Report in the European application No. 18936600.8, dated Apr. 13, 2022.

* cited by examiner

IDENTIFIER UPDATE METHOD, APPARATUS, DEVICE AND SYSTEM, AND STORAGE MEDIUM

CROSS-REFERENCE TO RELATED APPLICATION

This application is a U.S. national stage of International Application No. PCT/CN2018/110136 filed on Oct. 12, 2018, the disclosure of which is hereby incorporated by reference in its entirety.

TECHNICAL FIELD

The disclosure relates to the technical field of communications, and in particular to a method, apparatus, device and system for updating an identifier, and a storage medium.

BACKGROUND

The fourth-generation (4G) mobile communication technology introduces a sidelink (secondary link) technology to achieve direct communication between terminals. Herein, when the terminal performs communication by using the sidelink technology, protocol stacks involved from top to bottom in sequence includes an application layer, a Packet Data Convergence Protocol (PDCP) layer, a Radio Link Control (RLC) layer, a Media Access Control (MAC) layer and a physical (PHY) layer, and data generated by the application layer is encapsulated by the PDCP layer, the RLC layer and the MAC layer in sequence, and then sent out by the PHY layer.

When encapsulating an upper layer data, the MAC layer adds an MAC subheader in front of the upper layer data, a source identifier in the MAC subheader is used to identify a terminal serving as a data transmitting end and a target identifier therein is used to identify a terminal serving as a data receiving end, to achieve addressing. Herein, both the source identifier and the target identifier in the MAC subheader are identifiers generated by the application layer, and are character strings with fixed-length, such as a 24-bit character string, rather than an actual physical address of the terminal. When the identifier is a 24-bit character string, the character string cannot uniquely identify a terminal worldwide, therefore the application layer needs to update the identifier over time to avoid collisions with identifiers of other terminals due to usage of the same identifier for a long time.

In the related art, the source identifier in the MAC subheader in the data transmitted by a first terminal to a second terminal is a first identifier; when the application layer updates the first identifier to be a second identifier, the source identifier in the MAC subheader in the data transmitted by the first terminal to the second terminal is the second identifier. That is, before the identifier is updated, the source identifier in the MAC subheader is the first identifier; and after the identifier is updated, the source identifier in the MAC subheader is the second identifier.

Since the second terminal cannot know that the second identifier is an update of the first identifier, it may be considered that the first identifier and the second identifier identify different terminals, so that the data carrying the first identifier and the data carrying the second identifier cannot be merged, inducing data loss and affecting the reliability for data transmission.

SUMMARY

In order to solve the problems in the related art, the disclosure provides a method, apparatus, device and system for updating an identifier, and a storage medium.

According to a first aspect of the embodiments of the disclosure, there is provided a method for updating an identifier, the method includes the following operations.

During a process when a first terminal transmits data carrying a first identifier to a second terminal, the first terminal acquires a second identifier, where the second identifier is configured to update the first identifier, and both the first identifier and the second identifier are configured to identify the first terminal.

The first terminal transmits indication information to the second terminal, where the indication information is configured to indicate that the second identifier carried in data transmitted subsequently by the first terminal to the second terminal is an update of the first identifier.

In a possible implementation, the indication information includes the first identifier and the second identifier, and the first identifier and the second identifier are MAC layer identifiers, and the first terminal transmitting the indication information to the second terminal includes the following operations.

The first terminal generates an MAC Protocol Data Unit (PDU), an MAC Control Element (CE) in the MAC PDU carries the second identifier, and an MAC subheader in the MAC PDU carries the first identifier.

The first terminal encodes and modulates the MAC PDU to obtain data carrying the first identifier and the second identifier.

The first terminal transmits the data carrying the first identifier and the second identifier to the second terminal.

In a possible implementation, the indication information includes the first identifier and the second identifier, and the first identifier and the second identifier are physical (PHY) layer identifiers, and the first terminal transmitting the indication information to the second terminal includes the following operations.

The first terminal generates an MAC PDU, and an MAC CE in the MAC PDU carries the second identifier.

The first terminal encodes and modulates the first identifier and the MAC PDU to obtain data carrying the first identifier and the second identifier.

The first terminal transmits the data carrying the first identifier and the second identifier to the second terminal.

In a possible implementation, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the first terminal transmitting the indication information to the second terminal includes the following operations.

The first terminal generates an MAC PDU, an MAC CE in the MAC PDU carries the second MAC layer identifier, another MAC CE carries the second PHY layer identifier, and an MAC subheader in the MAC PDU carries the first MAC layer identifier.

The first terminal encodes and modulates the first PHY layer identifier and the MAC PDU to obtain data carrying the first identifier and the second identifier.

The first terminal transmits the data carrying the first identifier and the second identifier to the second terminal.

In a possible implementation, the indication information includes the first identifier, the second identifier and an effective time configured to indicate a time when the first terminal starts to transmit data carrying the second identifier, and the first terminal transmitting the indication information to the second terminal includes the following operations.

The first terminal broadcasts the first identifier, the second identifier and the effective time.

In a possible implementation, the indication information includes the first identifier and the second identifier, and the first terminal transmitting the indication information to the second terminal includes the following operations.

The first terminal broadcasts the first identifier and the second identifier.

Herein an effective time is pre-stored in the second terminal configured to indicate a time when the first terminal starts to transmit data carrying the second identifier.

In a possible implementation, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

According to a second aspect of the embodiments of the disclosure, there is provided a method for updating an identifier, the method includes the following operations.

During a process when a second terminal receives data carrying a first identifier and transmitted by a first terminal, the second terminal receives indication information transmitted by the first terminal, where the first identifier is configured to identify the first terminal.

The second terminal determines, according to the indication information, that a second identifier carried in data transmitted subsequently by the first terminal is an update of the first identifier, where the second identifier is configured to the first terminal.

In a possible implementation, the indication information includes the first identifier and the second identifier, and the first identifier and the second identifier are MAC layer identifiers, and the second terminal receiving the indication information transmitted by the first terminal includes the following operations.

The second terminal receives data carrying the first identifier and the second identifier from the first terminal.

The second terminal demodulates and decodes the data carrying the first identifier and the second identifier to obtain an MAC PDU.

The second terminal acquires the second identifier from an MAC CE in the MAC PDU, and acquires the first identifier from an MAC subheader in the MAC PDU.

In a possible implementation, the indication information includes the first identifier and the second identifier, and the first identifier and the second identifier are PHY layer identifiers, and the second terminal receiving the indication information transmitted by the first terminal includes the following operations.

The second terminal receives data carrying the first identifier and the second identifier from the first terminal.

The second terminal demodulates and decodes the data carrying the first identifier and the second identifier to obtain the first identifier and an MAC PDU.

The second terminal acquires the second identifier from an MAC CE in the MAC PDU.

In a possible implementation, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the second terminal receiving the indication information transmitted by the first terminal includes the following operations.

The second terminal receives data carrying the first identifier and the second identifier from the first terminal.

The second terminal demodulates and decodes the data carrying the first identifier and the second identifier to obtain the first PHY layer identifier and an MAC PDU.

The second terminal acquires the second MAC layer identifier from an MAC CE in the MAC PDU, and acquires the second PHY layer identifier from another MAC CE in the MAC PDU, and acquires the first MAC layer identifier from an MAC subheader in the MAC PDU.

In a possible implementation, the indication information includes the first identifier, the second identifier and an effective time configured to indicate a time when the first terminal starts to transmit data carrying the second identifier, and the second terminal receiving the indication information transmitted by the first terminal includes the following operations.

The second terminal receives the first identifier, the second identifier and the effective time broadcast by the first terminal.

In a possible implementation, the indication information includes the first identifier and the second identifier, and the second terminal receiving the indication information transmitted by the first terminal includes the following operations.

The second terminal receives the first identifier and the second identifier broadcast by the first terminal.

The second terminal acquires a pre-stored effective time, where the effective time indicates a time when the first terminal starts to transmit data carrying the second identifier.

In a possible implementation, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

According to a third aspect of the embodiments of the disclosure, there is provided an apparatus for updating an identifier, the apparatus includes the following modules.

An acquiring module is configured to acquire a second identifier during a process when a first terminal transmits data carrying a first identifier to a second terminal, where the second identifier is configured to update the first identifier, and both the first identifier and the second identifier are configured to identify the first terminal.

A transmitting module is configured to transmit indication information to the second terminal, where the indication information is configured to indicate that the second identifier carried in data transmitted subsequently by the first terminal to the second terminal is an update of the first identifier.

In a possible implementation, the indication information includes the first identifier and the second identifier, and the first identifier and the second identifier are MAC layer identifiers, and the transmitting module is further configured to:

generate an MAC PDU, an MAC CE in the MAC PDU carries the second identifier, and an MAC subheader in the MAC PDU carries the first identifier;

encode and modulate the MAC PDU to obtain data carrying the first identifier and the second identifier; and transmit the data carrying the first identifier and the second identifier to the second terminal.

In a possible implementation, the indication information includes the first identifier and the second identifier, and the first identifier and the second identifier are PHY layer identifiers, and the transmitting module is further configured to:

generate an MAC PDU, an MAC CE in the MAC PDU carries the second identifier;

encode and modulate the first identifier and the MAC PDU to obtain data carrying the first identifier and the second identifier; and transmit the data carrying the first identifier and the second identifier to the second terminal.

In a possible implementation, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the transmitting module is further configured to:

generate an MAC PDU, an MAC CE in the MAC PDU carries the second MAC layer identifier, another MAC CE carries the second PHY layer identifier, and an MAC subheader in the MAC PDU carries the first MAC layer identifier;

encode and modulate the first PHY layer identifier and the MAC PDU to obtain data carrying the first identifier and the second identifier; and transmit the data carrying the first identifier and the second identifier to the second terminal.

In a possible implementation, the indication information includes the first identifier, the second identifier and an effective time configured to indicate a time when the first terminal starts to transmit data carrying the second identifier, and the transmitting module is further configured to:

broadcast the first identifier, the second identifier and the effective time.

In a possible implementation, the indication information includes the first identifier and the second identifier, and the transmitting module is further configured to:

broadcast the first identifier and the second identifier;

herein an effective time is pre-stored in the second terminal configured to indicate a time when the first terminal starts to transmit data carrying the second identifier.

In a possible implementation, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

According to a fourth aspect of the embodiments of the disclosure, there is provided an apparatus for updating an identifier, the apparatus includes the following modules.

A receiving module is configured to receive indication information transmitted by a first terminal during a process when a second terminal receives data carrying a first identifier from the first terminal, where the first identifier is configured to identify the first terminal.

A determining module is configured to determine, according to the indication information, that a second identifier carried in data transmitted subsequently by the first terminal is an update of the first identifier, where the second identifier is configured to the first terminal.

In a possible implementation, the indication information includes the first identifier and the second identifier, and the first identifier and the second identifier are MAC layer identifiers, and the receiving module is further configured to:

receive data carrying the first identifier and the second identifier from the first terminal;

demodulate and decode the data carrying the first identifier and the second identifier to obtain an MAC PDU; and acquire the second identifier from an MAC CE in the MAC PDU, and acquire the first identifier from an MAC subheader in the MAC PDU.

In a possible implementation, the indication information includes the first identifier and the second identifier, and the first identifier and the second identifier are PHY layer identifiers, and the receiving module is further configured to:

receive data carrying the first identifier and the second identifier from the first terminal;

demodulate and decode the data carrying the first identifier and the second identifier to obtain the first identifier and an MAC PDU; and acquire the second identifier from an MAC CE in the MAC PDU.

In a possible implementation, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the receiving module is further configured to:

receive data carrying the first identifier and the second identifier from the first terminal;

demodulate and decode the data carrying the first identifier and the second identifier to obtain the first PHY layer identifier and an MAC PDU; and acquire the second MAC layer identifier from an MAC CE in the MAC PDU, and acquire the second PHY layer identifier from another MAC CE in the MAC PDU, and acquire the first MAC layer identifier from an MAC subheader in the MAC PDU.

In a possible implementation, the indication information includes the first identifier, the second identifier and an effective time configured to indicate a time when the first terminal starts to transmit data carrying the second identifier, and the receiving module is further configured to:

receive the first identifier, the second identifier and the effective time broadcast by the first terminal.

In a possible implementation, the indication information includes the first identifier and the second identifier, and the receiving module is further configured to:

receive the first identifier and the second identifier broadcast by the first terminal; and acquire a pre-stored effective time, where the effective time indicates a time when the first terminal starts to transmit data carrying the second identifier.

In a possible implementation, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

According to a fifth aspect of the embodiments of the disclosure, there is provided a first terminal, the first terminal includes:

a processor;

a memory storing instructions executable by the processor;

herein the processor is configured to:

acquire a second identifier during a process when the first terminal transmits data carrying a first identifier to a second terminal, where the second identifier is configured to update the first identifier, and both the first identifier and the second identifier are configured to identify the first terminal; and transmit indication information to the second terminal, where the indication information is configured to indicate that the second identifier carried in data transmitted subsequently by the first terminal to the second terminal is an update of the first identifier.

According to a sixth aspect of the embodiments of the disclosure, there is provided a second terminal, the second terminal includes:

a processor;

a memory storing instructions executable by the processor;

herein the processor is configured to:

receive indication information transmitted by a first terminal during a process when the second terminal receives data carrying a first identifier from the first terminal, where the first identifier is configured to identify the first terminal; and determine, according to the indication information, that a second identifier carried in data transmitted subsequently by the first terminal is an update of the first identifier, where the second identifier is configured to the first terminal.

According to a seventh aspect of the embodiments of the disclosure, there is provided a mobile communication system, including the apparatus for updating an identifier according to any one of the third aspect and the apparatus for updating an identifier according to any one of the fourth aspects, or including the first terminal according to any one of the fifth aspect and the second terminal according to any one of the sixth aspect.

According to an eighth aspect of the embodiments of the disclosure, there is provided a computer-readable storage medium having stored therein at least one instruction, at least one program segment, a code set or an instruction set that, when loaded and executed by a processor, cause the method for updating an identifier according to the first aspect or the method for updating an identifier according to the second aspect to be performed.

The technical solutions provided by the embodiments of the disclosure may include the following beneficial effects: when the first identifier needs to be updated to the second identifier during the process when the first terminal transmits data carrying the first identifier to the second terminal, the first terminal acquires the second identifier and then transmits the instruction information to the second terminal, so that the second terminal may determine, according to the indication information, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

It should be understood that the above generalized descriptions and the following detailed descriptions are only exemplary and cannot limit the disclosure.

BRIEF DESCRIPTION OF THE DRAWINGS

The accompanying drawings herein are incorporated into the description and form a part of the description of the disclosure, show embodiments consistent with the disclosure, and are used to explain the principle of the disclosure together with the description.

DETAILED DESCRIPTION

The exemplary embodiments will be described in detail here, and examples thereof are shown in the accompanying drawings. The following description refers to the accompanying drawings in which the same numbers in different drawings represent the same or similar elements unless otherwise represented. The implementations set forth in the following exemplary embodiments do not represent all implementations consistent with the disclosure. Instead, they are merely examples of apparatuses and methods consistent with aspects of the disclosure as recited in the appended claims.

Figure 1:
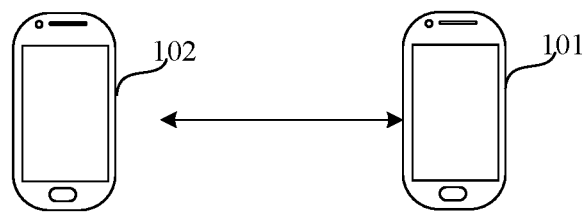
FIG. 1 is a schematic diagram of a mobile communication system involved in the embodiments of the disclosure.

FIG. 1 shows a schematic structural diagram of a mobile communication system provided by an embodiment of the disclosure. The mobile communication system may be a 5G system, also known as a New Radio (NR) system. The mobile communication system includes a first terminal 101 and a second terminal 102. Herein, the first terminal 101 may be used as a data transmitting terminal, and the second terminal 102 may be used as a data receiving terminal; or, the second terminal 102 may be used as a data transmitting terminal, and the first terminal 101 may be used as a data receiving terminal, the embodiment does not make limitation thereto.

The first terminal 101 may be a device that provides voice and/or data connectivity to a user. The first terminal 101 may communicate with one or more second terminals 102 via a Radio Access Network (RAN), and the first terminal 101 may be a mobile terminal, such as a mobile phone (or known as "cellular" phone) and a computer with a mobile terminal, for example, it may be a portable, pocket-sized, hand-held, built-in-computer or vehicle-mounted mobile apparatus. For example, a Subscriber Unit, a Subscriber Station, a Mobile Station, a Mobile, a Remote Station, an Access Point, a Remote Terminal, an Access terminal, a User Terminal, a User Agent, a User Device, or a User Equipment.

The second terminal 102 may be a device that provides voice and/or data connectivity to a user. Please refer to the descriptions in the previous paragraph for the details.

Figure 2:
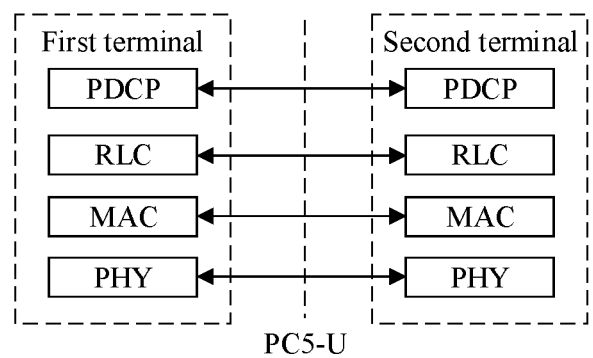
FIG. 2 is a schematic diagram of a protocol stack in a terminal involved in the embodiments of the disclosure.

When both the first terminal 101 and the second terminal 102 are provided with protocol stacks of a PDCP layer, a RLC layer, an MAC layer and a PHY layer, please refer to FIG. 2.

The first terminal 101 and the second terminal 102 establish a wireless connection through a wireless air interface. Optionally, the wireless air interface is a PC5 interface in a wireless air interface based on the fifth-generation mobile communication network technology (5G) standard, and the PC5 interface is an interface between terminals. Or, the wireless air interface may also be an interface between terminals, in a wireless air interface based on the 5G next-generation mobile communication network technology standard. In the embodiment, the first terminal 101 and the second terminal 102 establishing the wireless connection through the PC5 interface, is taken as an example for description.

When the first terminal 101 is used as the data transmitting end and the second terminal 102 is used as the data receiving end, data generated by an application layer in the first terminal 101 is encapsulated by the PDCP layer, the RLC layer and the MAC layer in sequence, and then modulated and encoded by the PHY layer, to obtain the encoded data to be transmitted finally. The PHY layer transmits the encoded data out through the PC5 interface between the first terminal 101 and the second terminal 102. The PHY layer in the second terminal 102 receives the encoded data through the PC5 interface between the first terminal 101 and the second terminal 102, demodulates and decodes the encoded data, and makes the decoded data decapsulated by passing through the MAC layer, the RLC layer and the PDCP layer in sequence, to be provided to the application layer.

It should be noted that the mobile communication system shown in FIG. 1 may include at least one of multiple first terminals 101 or multiple second terminals 102. In FIG. 1, one first terminal 101 and one second terminal 102 are shown as an example, but the embodiment does not make limitation thereto.

Figure 3:
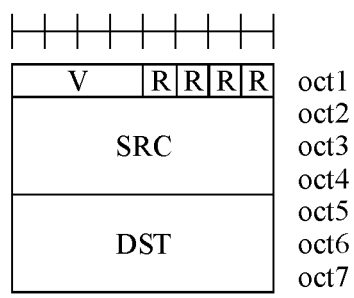
FIG. 3 is a schematic diagram of an MAC subheader involved in the embodiments of the disclosure.

In the above data transmission process, it also needs to indicate the terminal as the data transmitting end and the terminal as the data receiving end. In a possible implementation, a source identifier and a target identifier may be added to an MAC subheader, the source identifier identifies the terminal as the data transmitting end, and the target identifier identifies the terminal as the data receiving end. Please refer to FIG. 3, where SRC represents the source identifier, DST represents the target identifier, V represents the version number of the communication protocol, R represents a reserved bit, and oct1-7 represents the $1^{st}$-7th byte.

In this way, when the terminal used as the data receiving end receives data, it may determine whether the terminal indicated by the target identifier of the MAC subheader in the data is itself. When the terminal indicated by the target identifier is itself, the data is saved; and when the terminal indicated by the target identifier is not itself, the data is discarded to achieve filtering. Furthermore, when the terminal used as the data receiving end wants to transmit data to the terminal used as the data transmitting end, the terminal may be determined according to the source identifier in the MAC subheader in the data, and then the data is transmitted to the terminal to achieve addressing.

Both the source identifier and target identifier mentioned here are identifiers generated by the application layer, and are character strings with fixed-length, such as a 24-bit character string, rather than an actual physical address of the terminal. Since the identifier has a short length, it is not enough for the character string to uniquely identify a terminal worldwide, therefore the application layer needs to update the identifier over time to avoid collisions with identifiers of other terminals due to usage of the same identifier for a long time.

In the related art, when the first identifier of the first terminal is updated to the second identifier during the process when the first terminal is transmitting data to the second terminal, while the first terminal does not notify the second terminal that its identifier has changed, the second terminal cannot know that the second identifier is the update of the first identifier, it may be considered that the first identifier and the second identifier identify different terminals, so that the data carrying the first identifier and the data carrying the second identifier cannot be merged, inducing data loss and affecting the reliability for transmitting data. Instead, in the disclosure, when the first identifier is updated to the second identifier, the first terminal transmits the instruction information to the second terminal, so that the second terminal may determine, according to the indication information, that the second identifier carried in the data transmitted subsequently by the first terminal to the second terminal is the update of the first identifier. In this way, the second terminal may merge the data carrying the first identifier and the data carrying the second identifier, thereby improving the reliability for transmitting data.

Figure 4:
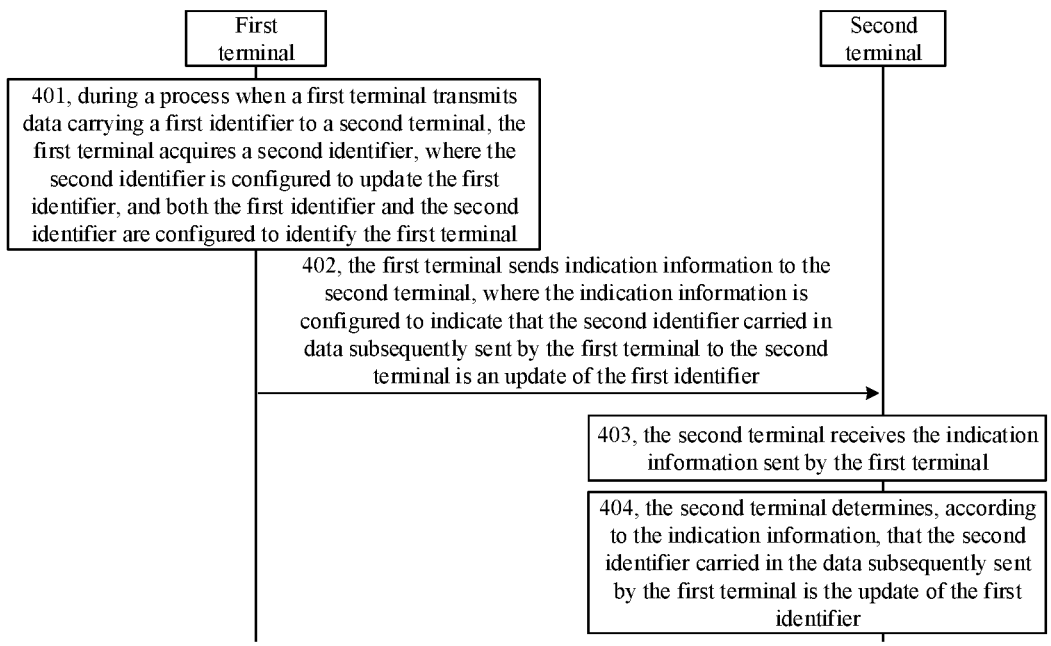
FIG. 4 is a flowchart showing a method for updating an identifier according to an exemplary embodiment.

FIG. 4 is a flowchart showing a method for updating an identifier according to an exemplary embodiment, the method for updating an identifier is applied to the mobile communication system shown in FIG. 1. As shown in FIG. 4, the method for updating an identifier includes the following operations.

In operation 401, during a process when a first terminal transmits data carrying a first identifier to a second terminal, the first terminal acquires a second identifier, where the second identifier is configured to update the first identifier, and both the first identifier and the second identifier are configured to identify the first terminal.

In operation 402, the first terminal transmits indication information to the second terminal, where the indication information is configured to indicate that the second identifier carried in data transmitted subsequently by the first terminal to the second terminal is an update of the first identifier.

In operation 403, the second terminal receives the indication information transmitted by the first terminal.

In operation 404, the second terminal determine, according to the indication information, that the second identifier carried in the data transmitted subsequently by the first terminal is the update of the first identifier.

Herein, the operations 401 and 402 may be separately implemented as an embodiment on the first terminal side, and the operations 403 and 404 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then transmits the instruction information to the second terminal, so that the second terminal may determine, according to the indication information, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

Figure 5:
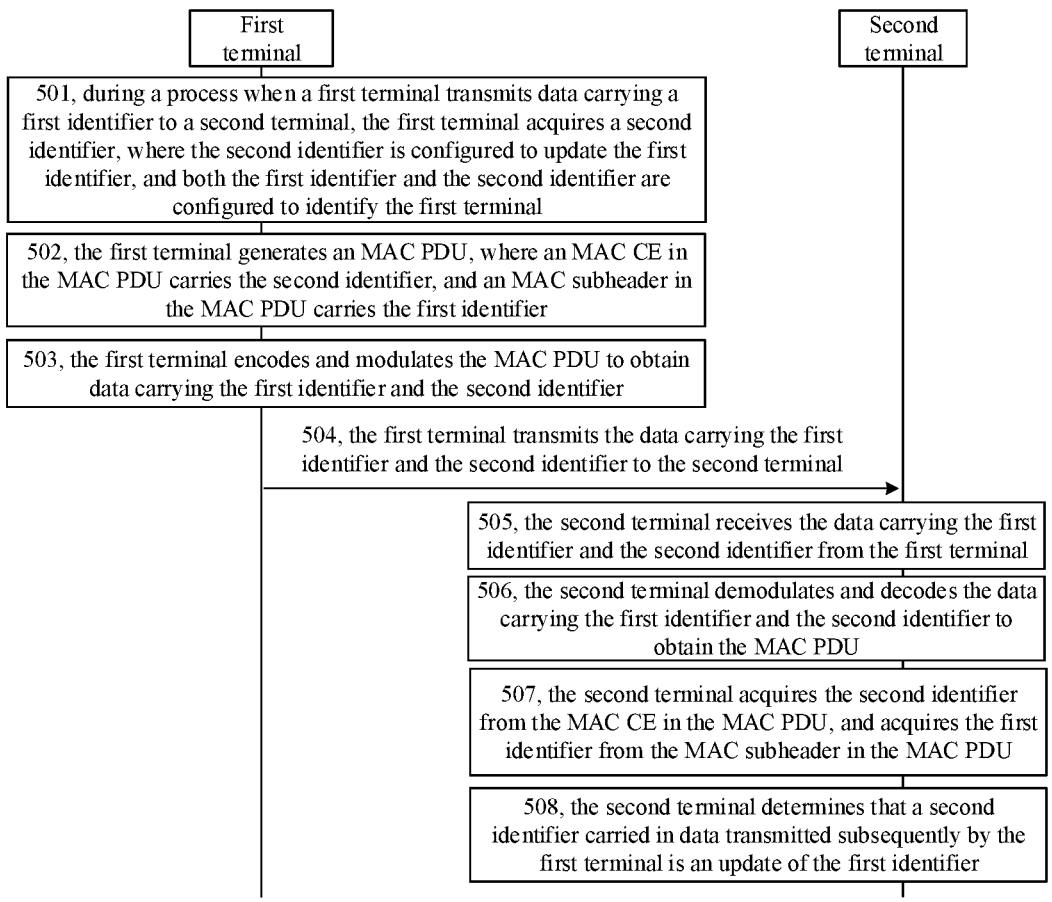
FIG. 5 is a flowchart showing a method for updating an identifier according to an exemplary embodiment.

FIG. 5 is a flowchart showing a method for updating an identifier according to another exemplary embodiment, the method for updating an identifier is applied to the mobile communication system shown in FIG. 1, and in the embodiment, the first identifier and the second identifier are MAC layer identifiers. As shown in FIG. 5, the method for updating an identifier includes the following operations.

In operation 501, during a process when a first terminal transmits data carrying a first identifier to a second terminal, the first terminal acquires a second identifier, where the second identifier is configured to update the first identifier, and both the first identifier and the second identifier are configured to identify the first terminal.

Herein, the first identifier and the second identifier are MAC layer identifiers, and the MAC layer identifier is an identifier used by the MAC layer to indicate the first terminal. The application layer in the first terminal may generate the MAC layer identifier directly. At the moment, there are correspondences between the MAC layer identifier and the first terminal.

In the embodiment, during the process when the first terminal transmits data carrying the first identifier to the second terminal, the application layer of the first terminal generates the first identifier, and forwards the first identifier to the MAC layer by passing through the PDCP layer and the RLC layer in sequence, and the application layer forwards the data generated and to be transmitted each time to the MAC layer by passing through the PDCP layer and the RLC layer in sequence. For the data generated and to be transmitted each time, the MAC layer generates an MAC PDU according to the first identifier and the data to be transmitted. At the moment, an MAC Service Data Unit (SDU) of the MAC PDU includes the data to be transmitted, the source identifier in the MAC subheader is the first identifier, and the target identifier is the identifier of the second terminal. The MAC layer forwards the MAC PDU to the PHY layer, and the PHY layer encodes and modulates the MAC PDU to obtain the data carrying the first identifier, and the second terminal is determined according to the target identifier, and the data carrying the first identifier is transmitted to the second terminal through the PC5 interface.

When the first identifier needs to be updated, the application layer of the first terminal generates the second identifier, and forwards the second identifier to the MAC layer by passing through the PDCP layer and the RLC layer in sequence.

In operation 502, the first terminal generates an MAC PDU, an MAC CE in the MAC PDU carries the second identifier, and an MAC subheader in the MAC PDU carries the first identifier.

After the MAC layer in the first terminal acquires the second identifier, it acquires the data to be transmitted at the moment, and then generates the MAC PDU according to the first identifier, the second identifier and the data to be transmitted. At the moment, the MAC SDU of the MAC PDU includes the data to be transmitted, an MAC CE of the MAC PDU includes the second identifier, the source identifier in the MAC subheader is the first identifier, and the target identifier is the identifier of the second terminal. Herein, when the MAC PDU includes at least two MAC CEs, any one of the MAC CEs may carry the second identifier, the embodiment does not make limitation thereto.

In operation 503, the first terminal encodes and modulates the MAC PDU to obtain data carrying the first identifier and the second identifier.

The MAC layer forwards the MAC PDU to the PHY layer, and the PHY layer encodes and modulates the MAC PDU to obtain the data carrying the first identifier and the second identifier.

In operation 504, the first terminal transmits the data carrying the first identifier and the second identifier to the second terminal.

The PHY layer determines the second terminal according to the target identifier, and transmits the data carrying the first identifier and the second identifier to the second terminal through the PC5 interface.

In operation 505, the second terminal receives data carrying the first identifier and the second identifier from the first terminal.

In operation 506, the second terminal demodulates and decodes the data carrying the first identifier and the second identifier to obtain the MAC PDU.

In operation 507, the second terminal acquires the second identifier from an MAC CE in the MAC PDU, and acquires the first identifier from an MAC subheader in the MAC PDU.

When the second terminal obtains the MAC PDU, it determines whether the terminal indicated by the target identifier of the MAC subheader in the data carrying the first identifier and the second identifier is itself first. When the terminal indicated by the target identifier is itself, the operation 507 is executed; and when the terminal indicated by the target identifier is not itself, the data carrying the first identifier and the second identifier is discarded.

In operation 508, the second terminal determines that a second identifier carried in data transmitted subsequently by the first terminal is an update of the first identifier.

Subsequently, the application layer in the first terminal forwards the data generated and to be transmitted each time to the MAC layer by passing through the PDCP layer and the RLC layer in sequence. For the data generated and to be transmitted each time, the MAC layer generates an MAC PDU according to the second identifier and the data to be transmitted. At the moment, an MAC SDU of the MAC PDU includes the data to be transmitted, the source identifier in the MAC subheader is the second identifier, and the target identifier is the identifier of the second terminal. The MAC layer forwards the MAC PDU to the PHY layer, and the PHY layer encodes and modulates the MAC PDU to obtain the data carrying the second identifier, and then the second terminal is determined according to the target identifier, and the data carrying the second identifier is transmitted to the second terminal through the PC5 interface. The second terminal receives the data carrying the second identifier, demodulates and decodes the data carrying the second identifier to obtain the MAC PDU, and determines whether the terminal indicated by the target identifier of the MAC subheader in the data carrying the second identifier is itself first, when the terminal indicated by the target identifier is itself, the data carrying the second identifier and the data carrying the first identifier are merged; when the terminal indicated by the target identifier is not itself, the data carrying the second identifier is discarded.

Assuming that the first terminal transmits data to the second terminal 6 times, and the second identifier is generated when the data is transmitted at the 4th time, the source identifier in the MAC subheader of the MAC PDU in the data of the previous 3 times is the first identifier, the source identifier in the subheader of the MAC PDU in the data of the 4th time is the first identifier, an MAC CE includes the second identifier, and the source identifier in the MAC subheader of the MAC PDU in the data of the last two times is the second identifier.

Herein, the operations 501 to 504 may be separately implemented as an embodiment on the first terminal side, and the operations 505 to 508 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then transmits the first identifier and the second identifier to the second terminal, so that the second terminal may determine, according to the first identifier and the second identifier, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

Figure 6:
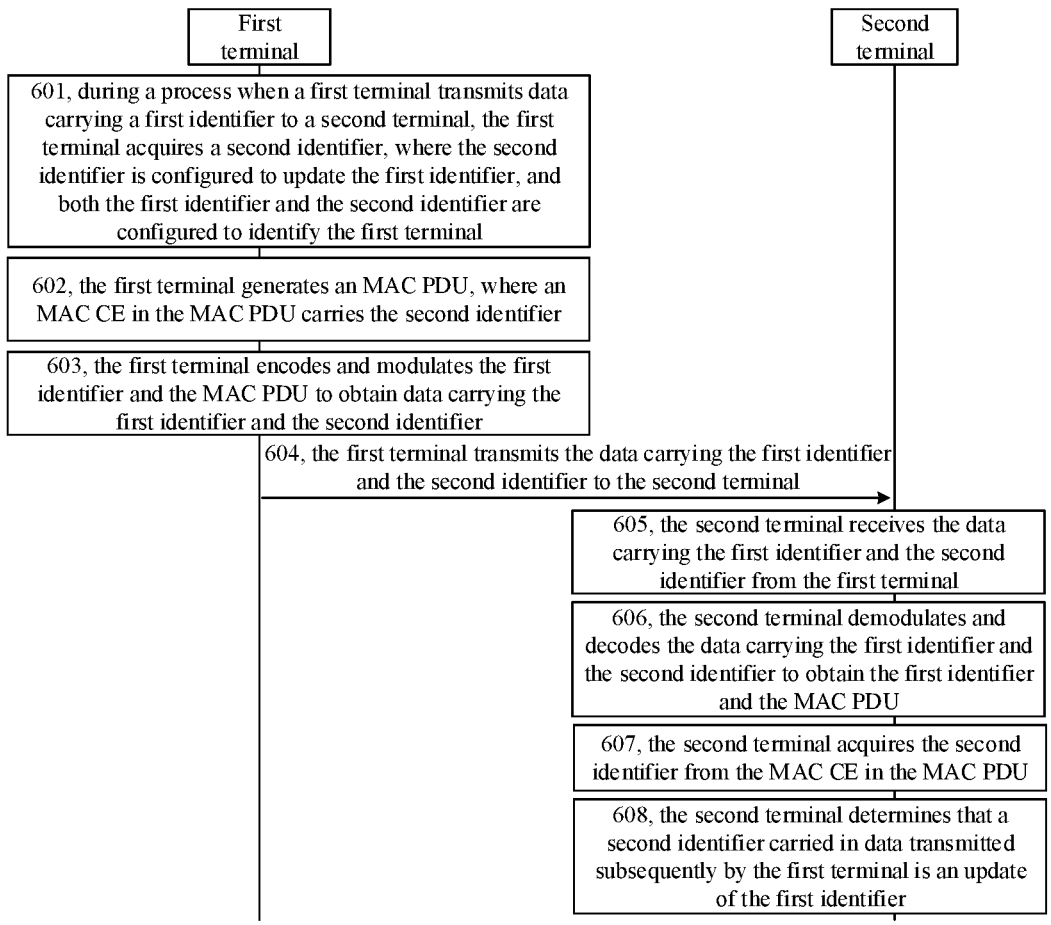
FIG. 6 is a flowchart showing a method for updating an identifier according to an exemplary embodiment.

FIG. 6 is a flowchart showing a method for updating an identifier according to another exemplary embodiment, the method for updating an identifier is applied to the mobile communication system shown in FIG. 1, and in the embodiment, the first identifier and the second identifier are PHY layer identifiers. As shown in FIG. 6, the method for updating an identifier includes the following operations.

In operation 601, during a process when a first terminal transmits data carrying a first identifier to a second terminal, the first terminal acquires a second identifier, where the second identifier is configured to update the first identifier, and both the first identifier and the second identifier are configured to identify the first terminal.

The first identifier and the second identifier are PHY layer identifiers, and the PHY layer identifier is an identifier used by the PHY layer to indicate the first terminal. The method for generating the PHY layer identifier is introduced below.

In the first generation method, the application layer in the first terminal may generate the PHY layer identifier directly. At the moment, there is no MAC layer identifier, and there are correspondences between the PHY layer identifier and the first terminal.

In the second generation method, the application layer in the first terminal may generate the MAC layer identifier first, and then generate the PHY layer identifier according to the MAC layer identifier. At the moment, there are correspondences among the PHY layer identifier, the MAC layer identifier and the first terminal. That is, the PHY layer identifier may indicate the MAC layer identifier directly, and the MAC layer identifier may indicate the first terminal directly.

When generating the PHY layer identifier according to the MAC layer identifier, part of the character strings in the MAC layer identifier may be selected as the PHY layer identifier, for example, the high 8-bit character string of the MAC layer is selected as the PHY layer identifier; or, the MAC layer identifier may also be subject to operation to obtain the PHY layer identifier, for example, the MAC layer identifier is inverted to obtain the PHY layer identifier. Of course, the PHY layer identifier may also be generated from the MAC layer identifier according to other algorithms, the embodiment does not make limitation thereto.

It should be noted that since the PHY layer identifiers generated according to different MAC layer identifiers may be the same or different, the embodiment is applicable to the case where the PHY layer identifiers generated according to different MAC layer identifiers are different. As to the case where the PHY layer identifiers generated according to different MAC layer identifiers may be the same, please refer to the descriptions of the embodiment shown in FIG. 7 for the details.

In the embodiment, during the process when the first terminal transmits data carrying the first identifier to the second terminal, the application layer of the first terminal generates the first identifier, and forwards the first identifier to the PHY layer by passing through the PDCP layer, the RLC layer and the MAC layer in sequence, and the application layer forwards the data generated and to be transmitted each time to the MAC layer by passing through the PDCP layer and the RLC layer in sequence. For the data generated and to be transmitted each time, the MAC layer generates an MAC PDU according to the data to be transmitted. At the moment, an MAC SDU of the MAC PDU includes the data to be transmitted. The MAC layer forwards the MAC PDU to the PHY layer, and the PHY layer encodes and modulates the first identifier, the identifier of the second terminal and the MAC PDU to obtain the data carrying the first identifier, and then the second terminal is determined according to the identifier of the second terminal, and the data carrying the first identifier is transmitted to the second terminal through the PC5 interface. The encoding and modulation of the first identifier, the identifier of the second terminal and the MAC PDU mentioned here may be adding a code stream identifying the first identifier and a code stream identifying the identifier of the second terminal before the MAC PDU, or may also be implemented in other ways, the embodiment does not make limitation thereto.

When the first identifier needs to be updated, the application layer of the first terminal generates the second identifier, and forwards the second identifier to the PHY layer by passing through the PDCP layer, the RLC layer and the MAC layer in sequence.

In operation 602, the first terminal generates an MAC PDU, and an MAC CE in the MAC PDU carries the second identifier.

After the MAC layer in the first terminal acquires the second identifier, it acquires the data to be transmitted at the moment, and then generates the MAC PDU according to the second identifier and the data to be transmitted. At the moment, the MAC SDU of the MAC PDU includes the data to be transmitted, an MAC CE of the MAC PDU includes the second identifier.

In operation 603, the first terminal encodes and modulates the first identifier and the MAC PDU to obtain data carrying the first identifier and the second identifier.

The MAC layer forwards the MAC PDU to the PHY layer, and the PHY layer encodes and modulates the first identifier, the identifier of the second terminal and the MAC PDU to obtain the data carrying the first identifier and the second identifier.

In operation 604, the first terminal transmits the data carrying the first identifier and the second identifier to the second terminal.

The PHY layer determines the second terminal according to the identifier of the second terminal, and transmits the data carrying the first identifier and the second identifier to the second terminal through the PC5 interface.

In operation 605, the second terminal receives data carrying the first identifier and the second identifier from the first terminal.

In operation 606, the second terminal demodulates and decodes the data carrying the first identifier and the second identifier to obtain the first identifier and the MAC PDU.

When the second terminal demodulates and decodes the data carrying the first identifier and the second identifier, it also obtains the identifier of the second terminal, and it determines whether the terminal indicated by the identifier of the second terminal is itself first. When the terminal indicated by the identifier of the second terminal is itself, the operation 607 is executed; and when the terminal indicated by the identifier of the second terminal is not itself, the data carrying the first identifier and the second identifier is discarded.

In operation 607, the second terminal acquires the second identifier from an MAC CE in the MAC PDU.

In operation 608, the second terminal determines that a second identifier carried in data transmitted subsequently by the first terminal is an update of the first identifier.

Subsequently, the application layer in the first terminal forwards the data generated and to be transmitted each time to the MAC layer by passing through the PDCP layer and the RLC layer in sequence. For the data generated and to be transmitted each time, the MAC layer generates an MAC PDU according to the data to be transmitted. At the moment, an MAC SDU of the MAC PDU includes the data to be transmitted. The MAC layer forwards the MAC PDU to the PHY layer, and the PHY layer encodes and modulates the second identifier, the identifier of the second terminal and the MAC PDU to obtain the data carrying the second identifier, and then the second terminal is determined according to the identifier of the second terminal, and the data carrying the second identifier is transmitted to the second terminal through the PC5 interface. The second terminal receives the data carrying the second identifier, demodulates and decodes the data carrying the second identifier to obtain the identifier of the second terminal, the second identifier and the MAC PDU, and determines whether the terminal indicated by the identifier of the second terminal is itself first, when the terminal indicated by the identifier of the second terminal is itself, the data carrying the second identifier and the data carrying the first identifier are merged; when the terminal indicated by the identifier of the second terminal is not itself, the data carrying the second identifier is discarded.

Assuming that the first terminal transmits data to the second terminal 6 times, and the second identifier is generated when the data is transmitted at the 4th time, the data of the previous 3 times includes code stream identifying the first identifier and the MAC PDU, the data of the 4th time includes a code stream identifying the first identifier and the MAC PDU, an MAC CE of the MAC PDU includes the second identifier, and the data of the last two times includes a code stream identifying the second identifier and the MAC PDU.

Herein, the operations 601 to 604 may be separately implemented as an embodiment on the first terminal side, and the operations 605 to 608 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then transmits the first identifier and the second identifier to the second terminal, so that the second terminal may determine, according to the first identifier and the second identifier, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

In the embodiment shown in FIG. 5, the first terminal may be identified by the MAC layer identifier, and in the embodiment shown in FIG. 6, the first terminal may be identified by the PHY layer identifier, so that the first terminal may be identified in multiple ways, which enriches the way of identifying the first terminal.

Figure 7:
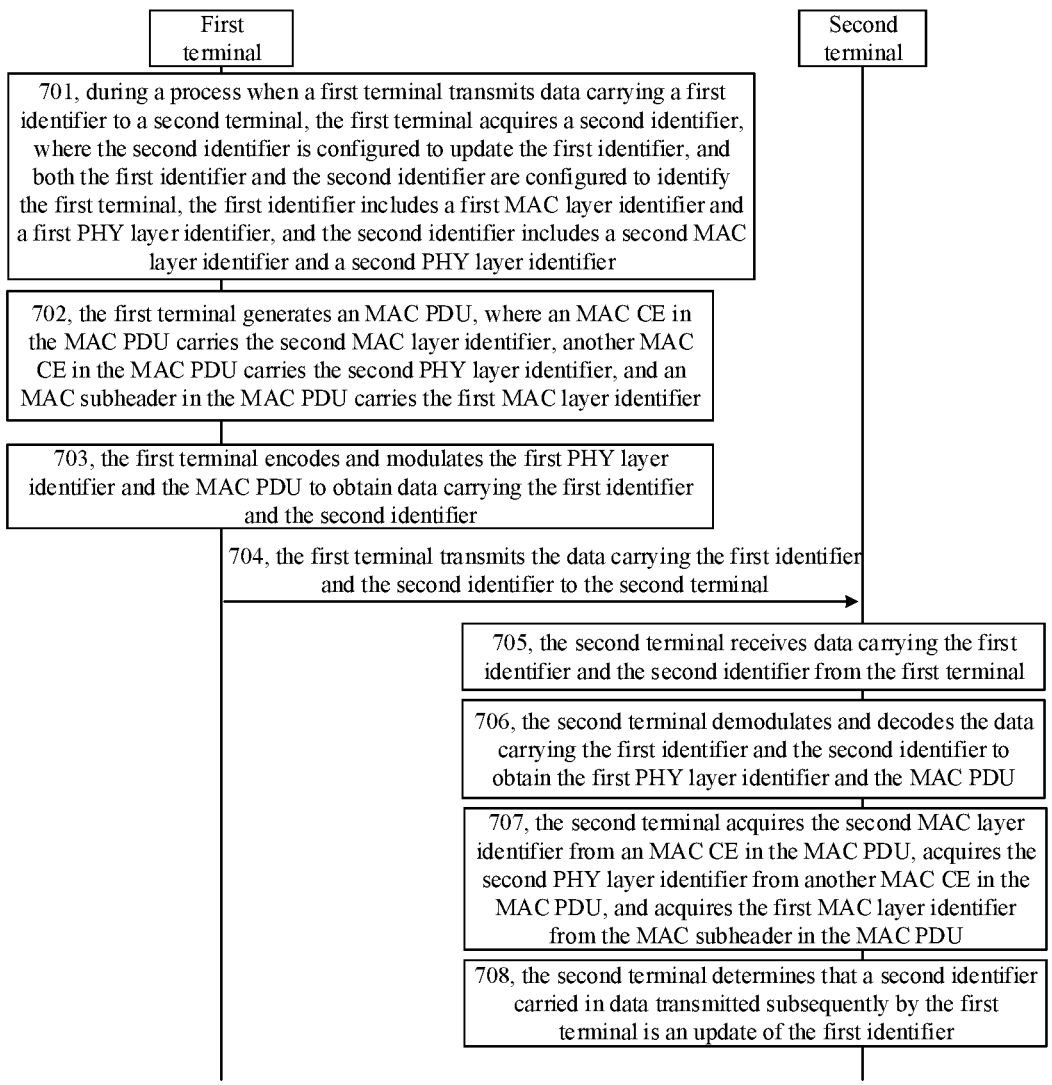
FIG. 7 is a flowchart showing a method for updating an identifier according to an exemplary embodiment.

FIG. 7 is a flowchart showing a method for updating an identifier according to another exemplary embodiment, the method for updating an identifier is applied to the mobile communication system shown in FIG. 1, and in the embodiment, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier. As shown in FIG. 7, the method for updating an identifier includes the following operations.

In operation 701, during a process when a first terminal transmits data carrying a first identifier to a second terminal, the first terminal acquires a second identifier, where the second identifier is configured to update the first identifier, and both the first identifier and the second identifier are configured to identify the first terminal, the first identifier includes the first MAC layer identifier and the first PHY layer identifier, and the second identifier includes the second MAC layer identifier and the second PHY layer identifier.

In the embodiment, the first identifier includes the first MAC layer identifier and the first PHY layer identifier, and the second identifier includes the second MAC layer identifier and the second PHY layer identifier. Herein, the MAC layer identifier is an identifier used by the MAC layer to indicate the first terminal, and the second MAC layer identifier update the first MAC layer identifier. The PHY layer identifier is an identifier used by the PHY layer to indicate the first terminal, and the second PHY layer identifier update the first PHY layer identifier. The method for generating the MAC layer identifier and the PHY layer identifier is introduced below.

In the first generation method, the application layer in the first terminal may generate the MAC layer identifier and the PHY layer identifier directly. At the moment, there are correspondences between the MAC layer identifier and the first terminal, and there are correspondences between the PHY layer identifier and the first terminal; or, there are correspondences among the MAC layer identifier, the PHY layer identifier and the first terminal.

In the second generation method, the application layer in the first terminal may generate the MAC layer identifier first, and then generate the PHY layer identifier according to the MAC layer identifier. At the moment, there are correspondences among the PHY layer identifier, the MAC layer identifier and the first terminal.

When generating the PHY layer identifier according to the MAC layer identifier, part of the character strings in the MAC layer identifier may be selected as the PHY layer identifier, for example, the high 8-bit character string of the MAC layer is selected as the PHY layer identifier; or, the MAC layer identifier may also be subject to operation to obtain the PHY layer identifier, for example, the MAC layer identifier is inverted to obtain the PHY layer identifier. Of course, the PHY layer identifier may also be generated from the MAC layer identifier according to other algorithms, the embodiment does not make limitation thereto.

It should be noted that since the PHY layer identifiers generated according to different MAC layer identifiers may be the same or different, the embodiment is applicable to the case where the PHY layer identifiers generated according to different MAC layer identifiers may be the same, thus it needs to carry the MAC layer identifier and PHY layer identifier in the data simultaneously.

In the embodiment, during the process when the first terminal transmits data carrying the first MAC layer identifier and the first PHY layer identifier to the second terminal, the application layer of the first terminal generates the first MAC layer identifier and the first PHY layer identifier, and forwards the first MAC layer identifier to the MAC layer by passing through the PDCP layer and the RLC layer in sequence, and forwards the first PHY layer identifier to the PHY layer by passing through the PDCP layer, the RLC layer and the MAC layer in sequence. The application layer forwards the data generated and to be transmitted each time to the MAC layer by passing through the PDCP layer and the RLC layer in sequence. For the data generated and to be transmitted each time, the MAC layer generates an MAC PDU according to the first MAC layer identifier and the data to be transmitted. At the moment, an MAC SDU of the MAC PDU includes the data to be transmitted, and the MAC subheader of the MAC PDU includes the first MAC layer identifier. The MAC layer forwards the MAC PDU to the PHY layer, and the PHY layer encodes and modulates the first PHY layer identifier, the identifier of the second terminal and the MAC PDU to obtain the data carrying the first identifier, and then the second terminal is determined according to the identifier of the second terminal, and the data carrying the first identifier is transmitted to the second terminal through the PC5 interface. The encoding and modulation of the first PHY layer identifier, the identifier of the second terminal and the MAC PDU mentioned here may be adding a code stream identifying the first PHY layer identifier and a code stream identifying the identifier of the second terminal before the MAC PDU, or may also be implemented in other ways, the embodiment does not make limitation thereto.

When the first MAC layer identifier and the first PHY layer identifier need to be updated, the application layer of the first terminal generates the second MAC layer identifier and the second PHY layer identifier, and forwards the second MAC layer identifier to the MAC layer by passing through the PDCP layer and the RLC layer in sequence, and forwards the second PHY layer identifier to the MAC layer the PHY layer by passing through the PDCP layer and the RLC layer in sequence.

In operation 702, the first terminal generates an MAC PDU, an MAC CE in the MAC PDU carries the second MAC layer identifier, another MAC CE carries the second PHY layer identifier, and an MAC subheader in the MAC PDU carries the first MAC layer identifier.

After the MAC layer in the first terminal acquires the second MAC layer identifier and the second PHY layer identifier, it acquires the data to be transmitted at the moment, and then generates the MAC PDU according to the second MAC layer identifier, the second PHY layer identifier and the data to be transmitted. At the moment, the MAC SDU of the MAC PDU includes the data to be transmitted, an MAC CE in the MAC PDU includes the second MAC layer identifier, another MAC CE in the MAC PDU includes the second PHY layer identifier.

In operation 703, the first terminal encodes and modulates the first PHY layer identifier and the MAC PDU to obtain data carrying the first identifier and the second identifier.

The MAC layer forwards the MAC PDU to the PHY layer, and the PHY layer encodes and modulates the first PHY layer identifier, the identifier of the second terminal and the MAC PDU to obtain the data carrying the first identifier and the second identifier.

In operation 704, the first terminal transmits the data carrying the first identifier and the second identifier to the second terminal.

The PHY layer determines the second terminal according to the identifier of the second terminal, and transmits the data carrying the first identifier and the second identifier to the second terminal through the PC5 interface.

In operation 705, the second terminal receives data carrying the first identifier and the second identifier from the first terminal.

In operation 706, the second terminal demodulates and decodes the data carrying the first identifier and the second identifier to obtain the first PHY layer identifier and the MAC PDU.

When the second terminal demodulates and decodes the data carrying the first identifier and the second identifier, it also obtains the identifier of the second terminal, and it determines whether the terminal indicated by the identifier of the second terminal is itself first. When the terminal indicated by the identifier of the second terminal is itself, the operation 707 is executed; and when the terminal indicated by the identifier of the second terminal is not itself, the data carrying the first identifier and the second identifier is discarded.

In operation 707, the second terminal acquires the second MAC layer identifier from an MAC CE in the MAC PDU, acquires the second PHY layer identifier from another MAC CE in the MAC PDU, and acquires the first MAC layer identifier from the MAC subheader in the MAC PDU.

In operation 708, the second terminal determines that a second identifier carried in data transmitted subsequently by the first terminal is an update of the first identifier.

Subsequently, the application layer in the first terminal forwards the data generated and to be transmitted each time to the MAC layer by passing through the PDCP layer and the RLC layer in sequence. For the data generated and to be transmitted each time, the MAC layer generates an MAC PDU according to the second MAC layer identifier and the data to be transmitted. At the moment, an MAC SDU of the MAC PDU includes the data to be transmitted, and the MAC subheader of the MAC PDU includes the second MAC layer identifier. The MAC layer forwards the MAC PDU to the PHY layer, and the PHY layer encodes and modulates the second PHY layer identifier, the identifier of the second terminal and the MAC PDU to obtain the data carrying the second identifier, and then the second terminal is determined according to the identifier of the second terminal, and the data carrying the second identifier is transmitted to the second terminal through the PC5 interface. The second terminal receives the data carrying the second identifier, demodulates and decodes the data carrying the second identifier to obtain the identifier of the second terminal, the second PHY layer identifier and the MAC PDU, and determines whether the terminal indicated by the identifier of the second terminal is itself first, when the terminal indicated by the identifier of the second terminal is itself, the data carrying the second identifier and the data carrying the first identifier are merged; when the terminal indicated by the identifier of the second terminal is not itself, the data carrying the second identifier is discarded.

Assuming that the first terminal transmits data to the second terminal 6 times, and the second identifier is generated when the data is transmitted at the 4th time, the data of the previous 3 times includes code stream identifying the first PHY layer identifier and the MAC PDU, and the MAC subheader in the MAC PDU includes the first MAC layer identifier; the data of the 4th time includes a code stream identifying the first PHY layer identifier and the MAC PDU, an MAC CE of the MAC PDU includes the second MAC layer identifier, another MAC CE of the MAC PDU includes the second PHY layer identifier, and the MAC subheader in the MAC PDU includes the first MAC layer identifier; and the data of the last two times includes a code stream identifying the second PHY layer identifier and the MAC PDU, and the MAC subheader in the MAC PDU includes the second MAC layer identifier.

Herein, the operations 701 to 704 may be separately implemented as an embodiment on the first terminal side, and the operations 705 to 708 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then transmits the first identifier and the second identifier to the second terminal, so that the second terminal may determine, according to the first identifier and the second identifier, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

When the PHY layer identifiers generated according to different MAC layer identifiers may be the same, it cannot uniquely identify the first terminal by the PHY layer identifier only. Therefore, the embodiment uses the PHY layer identifier and the MAC layer identifier to identify the first terminal simultaneously, thereby improving the accuracy of identifying the first terminal.

Figure 8:
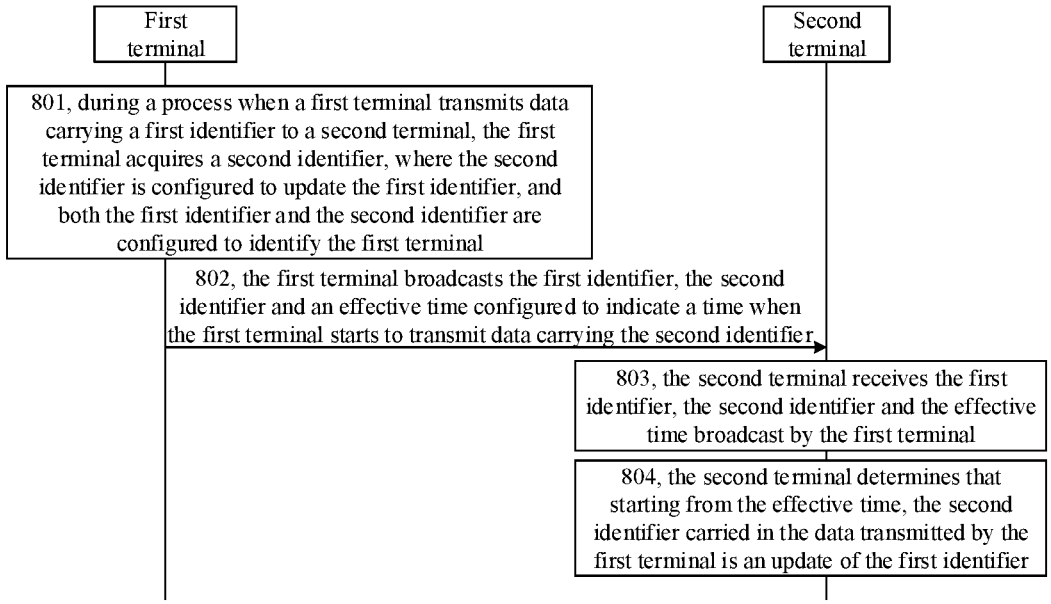
FIG. 8 is a flowchart showing a method for updating an identifier according to an exemplary embodiment.

FIG. 8 is a flowchart showing a method for updating an identifier according to another exemplary embodiment, the method for updating an identifier is applied to the mobile communication system shown in FIG. 1. As shown in FIG. 8, the method for updating an identifier includes the following operations.

In operation 801, during a process when a first terminal transmits data carrying a first identifier to a second terminal, the first terminal acquires a second identifier, where the second identifier is configured to update the first identifier, and both the first identifier and the second identifier are configured to identify the first terminal.

When the first identifier and the second identifier are MAC layer identifiers, the implementation of the operation 801 is described in detail in the operation 501; when the first identifier and the second identifier are PHY layer identifiers, the implementation of the operation 801 is described in detail in the operation 601; when the first identifier includes the first MAC layer identifier and the first PHY layer identifier, the second identifier includes the second MAC layer identifier and the second PHY layer identifier, the second MAC layer identifier is configured to the first MAC layer identifier, and the second PHY layer identifier is configured to the first PHY layer identifier, the implementation of the operation 801 is described in detail in the operation 701, which will not be repeated here.

In operation 802, the first terminal broadcasts the first identifier, the second identifier and an effective time configured to indicate a time when the first terminal starts to transmit data carrying the second identifier.

The effective time mentioned here may be any time, for example, the effective time may be the next system frame, the next subframe, the next symbol, etc., the embodiment does not make limitation thereto. Herein, the effective time may be generated by the application layer in the first terminal, the embodiment does not make limitation thereto.

The application layer forwards the first identifier, the second identifier and the effective time to the PHY layer by passing through the PDCP layer, the RLC layer and the MAC layer in sequence, and the PHY layer broadcasts the first identifier, the second identifier and the effective time in the Radio Resource Control (RRC) broadcast message.

In operation 803, the second terminal receives the first identifier, the second identifier and the effective time broadcast by the first terminal.

In operation 804, the second terminal determines that starting from the effective time, the second identifier carried in the data transmitted by the first terminal is an update of the first identifier.

When the first identifier and the second identifier are MAC layer identifiers, starting from the effective time, the implementation of the operation 804 is described in detail in the operation 508; when the first identifier and the second identifier are PHY layer identifiers, starting from the effective time, the implementation of the operation 804 is described in detail in the operation 608; when the first identifier includes the first MAC layer identifier and the first PHY layer identifier, the second identifier includes the second MAC layer identifier and the second PHY layer identifier, the second MAC layer identifier is configured to the first MAC layer identifier, and the second PHY layer identifier is configured to the first PHY layer identifier, starting from the effective time, the implementation of the operation 804 is described in detail in the operation 708, which will not be repeated here.

Herein, the operations 801 and 802 may be separately implemented as an embodiment on the first terminal side, and the operations 803 and 804 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then broadcasts the first identifier, the second identifier and the effective time to the second terminal, so that the second terminal may determine, according to the first identifier, the second identifier and the effective time, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

Figure 9:
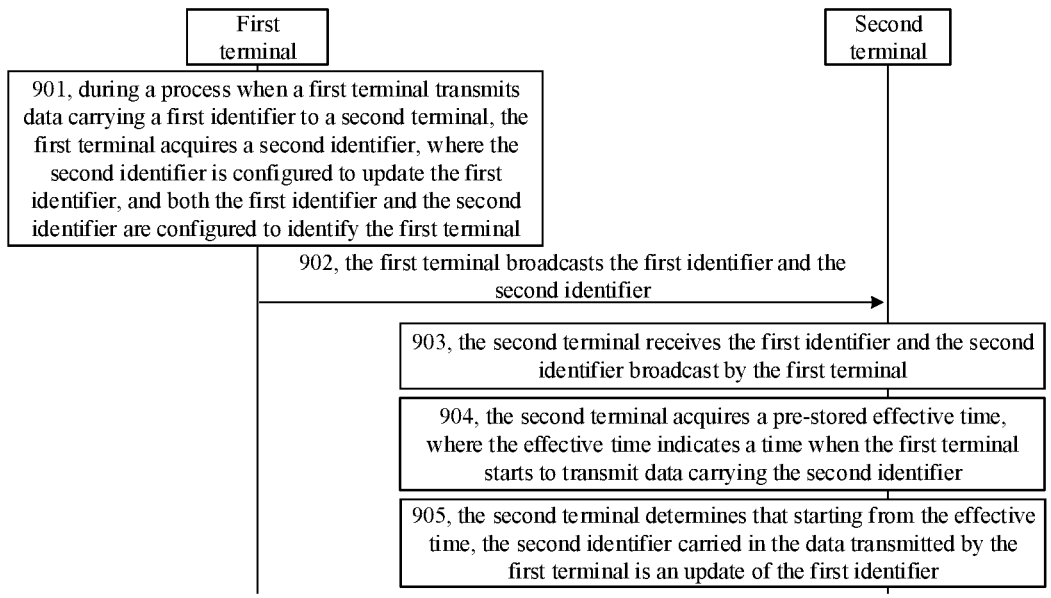
FIG. 9 is a flowchart showing a method for updating an identifier according to an exemplary embodiment.

FIG. 9 is flowchart showing a method for updating an identifier according to another exemplary embodiment, the method for updating an identifier is applied to the mobile communication system shown in FIG. 1. As shown in FIG. 9, the method for updating an identifier includes the following operations.

In operation 901, during a process when a first terminal transmits data carrying a first identifier to a second terminal, the first terminal acquires a second identifier, where the second identifier is configured to update the first identifier, and both the first identifier and the second identifier are configured to identify the first terminal.

Herein, the implementation of the operation 901 is described in detail in the operation 901, which will not be repeated here.

In operation 902, the first terminal broadcasts the first identifier and the second identifier.

The difference from the operation 802 is that in the embodiment, the effective time is specified by a communication protocol, that is, the effective time is pre-stored in the second terminal. Therefore, the first terminal may broadcast the first identifier and the second identifier only, without broadcasting the effective time.

The effective time is described in detail in the operation 802, which will not be repeated here.

In operation 903, the second terminal receives the first identifier and the second identifier broadcast by the first terminal.

In operation 904, the second terminal acquires a pre-stored effective time, where the effective time indicates a time when the first terminal starts to transmit data carrying the second identifier.

In operation 905, the second terminal determines that starting from the effective time, the second identifier carried in the data transmitted by the first terminal is an update of the first identifier.

The implementation of the operation 905 is described in detail in the operation 804, which will not be repeated here.

Herein, the operations 901 and 902 may be separately implemented as an embodiment on the first terminal side, and the operations 903 to 905 may be separately implemented as an embodiment on the second terminal side.

In summary, according to the method for updating an identifier provided by the disclosure, when the first identifier needs to be updated to the second identifier during the process when the first terminal transmits data carrying the first identifier to the second terminal, the first terminal acquires the second identifier and then broadcasts the first identifier and the second identifier to the second terminal, so that the second terminal may determine, according to the first identifier and the second identifier, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

Since the effective time is pre-stored in the second terminal, the first terminal may broadcast the first identifier and the second identifier only, which may save transmission resources compared with the first terminal broadcasting the first identifier, the second identifier and the effective time.

It should be noted that in the embodiments shown in FIGS. 5 to 7, the second identifier is indicated by the MAC CE, and in the embodiments shown in FIGS. 8 and 9, the second identifier is indicated by broadcasting. The effects of the two indication methods are analyzed below.

When the second identifier is indicated by the MAC CE, the second terminal may determine that the data received after receiving the indication information carries the second identifier, that is, the effective time of the second identifier is more accurate, so that the second terminal may merge all the data carrying the first identifier and the data carrying the second identifier, improving the reliability for transmitting data. Instead, when the second identifier is indicated by broadcasting, although the second terminal may acquire the effective time of the second identifier, since there may be a latency during the data transmission and time may be consumed on parsing the RRC broadcast message, the second terminal may receive the data carrying the second identifier first, and then receive the broadcast second identifier and the effective time, then the data received first and carrying the second identifier and the data carrying the first identifier cannot be merged, which also induces data loss, thereby affecting the reliability for transmitting data.

When the second identifier is indicated by the MAC CE, in case that the first terminal communicates with at least two second terminals simultaneously, the second identifier needs to be indicated in the data transmitted to each of the second terminals, which wastes transmission resources. Instead, when the second identifier is indicated by broadcasting, the first terminal may indicate the second identifier to the at least two second terminals simultaneously by broadcasting, which may save transmission resources.

Figure 10:
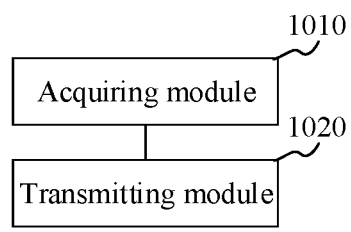
FIG. 10 is a block diagram showing an apparatus for updating an identifier according to an exemplary embodiment.

FIG. 10 is a block diagram showing an apparatus for updating an identifier according to an exemplary embodiment. The apparatus for updating an identifier is applied to the first terminal 101 shown in FIG. 1. As shown in FIG. 10, the apparatus for updating an identifier updating device includes an acquiring module 1010 and a transmitting module 1020;

The acquiring module 1010 is configured to acquire a second identifier during a process when a first terminal transmits data carrying a first identifier to a second terminal, where the second identifier is configured to update the first identifier, and both the first identifier and the second are configured to identifier identify the first terminal; and The transmitting module 1020 is configured to transmit an indication information to the second terminal, where the indication information is configured to indicate that the second identifier carried in data transmitted subsequently by the first terminal to the second terminal is an update of the first identifier.

In an embodiment of the disclosure, the indication information includes the first identifier and the second identifier, and the first identifier and the second identifier are MAC layer identifiers, and the transmitting module 1020 is further configured to: generate an MAC PDU, an MAC CE in the MAC PDU carries the second identifier, and an MAC subheader in the MAC PDU carries the first identifier; encode and modulate the MAC PDU to obtain data carrying the first identifier and the second identifier; and transmit the data carrying the first identifier and the second identifier to the second terminal.

In an embodiment of the disclosure, the indication information includes the first identifier and the second identifier, and the first identifier and the second identifier are PHY layer identifiers, and the transmitting module 1020 is further configured to: generate an MAC PDU, an MAC CE in the MAC PDU carries the second identifier; encode and modulate the first identifier and the MAC PDU to obtain data carrying the first identifier and the second identifier; and transmit the data carrying the first identifier and the second identifier to the second terminal.

In an embodiment of the disclosure, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the transmitting module 1020 is further configured to: generate an MAC PDU, an MAC CE in the MAC PDU carries the second MAC layer identifier, another MAC CE carries the second PHY layer identifier, and an MAC subheader in the MAC PDU carries the first MAC layer identifier; encode and modulate the first PHY layer identifier and the MAC PDU to obtain data carrying the first identifier and the second identifier; and transmit the data carrying the first identifier and the second identifier to the second terminal.

In an embodiment of the disclosure, the indication information includes the first identifier, the second identifier and an effective time configured to indicate a time when the first terminal starts to transmit data carrying the second identifier, and the transmitting module 1020 is further configured to: broadcast the first identifier, the second identifier and the effective time.

In an embodiment of the disclosure, the indication information includes the first identifier and the second identifier, and the transmitting module 1020 is further configured to: broadcast the first identifier and the second identifier; herein an effective time is pre-stored in the second terminal configured to indicate a time when the first terminal starts to transmit data carrying the second identifier.

In an embodiment of the disclosure, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

In summary, according to the apparatus for updating an identifier provided by the disclosure, when the first identifier needs to be updated to the second identifier during the process when the first terminal transmits data carrying the first identifier to the second terminal, the first terminal acquires the second identifier and then transmits the instruction information to the second terminal, so that the second terminal may determine, according to the indication information, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

Figure 11:
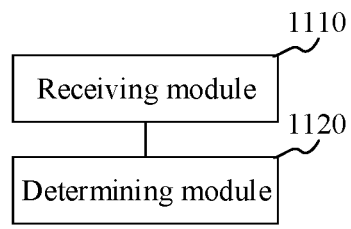
FIG. 11 is a block diagram showing an apparatus for updating an identifier according to an exemplary embodiment.

FIG. 11 is a block diagram showing an apparatus for updating an identifier according to an exemplary embodiment, the apparatus for updating an identifier is applied to the second terminal 102 shown in FIG. 1. As shown in FIG. 11, the apparatus for updating an identifier includes a receiving module 1110 and a determining module 1120;

The receiving module 1110 is configured to receive indication information transmitted by a first terminal during a process when a second terminal receives data carrying a first identifier from the first terminal, where the first identifier is configured to identify the first terminal; and The determining module 1120 is configured to determine, according to the indication information, that a second identifier carried in data transmitted subsequently by the first terminal is an update of the first identifier, where the second identifier is configured to the first terminal.

In an embodiment of the disclosure, the indication information includes the first identifier and the second identifier, and the first identifier and the second identifier are MAC layer identifiers, and the receiving module 1110 is further configured to: receive data carrying the first identifier and the second identifier from the first terminal; demodulate and decode the data carrying the first identifier and the second identifier to obtain an MAC PDU; and acquire the second identifier from an MAC CE in the MAC PDU, and acquire the first identifier from an MAC subheader in the MAC PDU.

In an embodiment of the disclosure, the indication information includes the first identifier and the second identifier, and the first identifier and the second identifier are PHY layer identifiers, and the receiving module 1110 is further configured to: receive data carrying the first identifier and the second identifier from the first terminal; demodulate and decode the data carrying the first identifier and the second identifier to obtain the first identifier and an MAC PDU; and acquire the second identifier from an MAC CE in the MAC PDU.

In an embodiment of the disclosure, the indication information includes the first identifier and the second identifier, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier, and the receiving module 1110 is further configured to: receive data carrying the first identifier and the second identifier from the first terminal; demodulate and decode the data carrying the first identifier and the second identifier to obtain the first PHY layer identifier and an MAC PDU; and acquire the second MAC layer identifier from an MAC CE in the MAC PDU, and acquire the second PHY layer identifier from another MAC CE in the MAC PDU, and acquire the first MAC layer identifier from an MAC subheader in the MAC PDU.

In an embodiment of the disclosure, the indication information includes the first identifier, the second identifier and an effective time configured to indicate a time when the first terminal starts to transmit data carrying the second identifier, and the receiving module 1110 is further configured to: receive the first identifier, the second identifier and the effective time broadcast by the first terminal.

In an embodiment of the disclosure, the indication information includes the first identifier and the second identifier, and the receiving module 1110 is further configured to: receive the first identifier and the second identifier broadcast by the first terminal; and acquire a pre-stored effective time, where the effective time indicates a time when the first terminal starts to transmit data carrying the second identifier.

In an embodiment of the disclosure, the first identifier and the second identifier are MAC layer identifiers; or, the first identifier and the second identifier are PHY layer identifiers; or, the first identifier includes a first MAC layer identifier and a first PHY layer identifier, and the second identifier includes a second MAC layer identifier and a second PHY layer identifier, the second MAC layer identifier is configured to the first MAC layer identifier, and the second PHY layer identifier is configured to the first PHY layer identifier.

In summary, according to the apparatus for updating an identifier provided by the disclosure, when the first identifier needs to be updated to the second identifier during the process when the first terminal transmits data carrying the first identifier to the second terminal, the first terminal acquires the second identifier and then transmits the instruction information to the second terminal, so that the second terminal may determine, according to the indication information, that the second identifier carried in the data transmitted subsequently by the first terminal to the second terminal is the update of the first identifier. In this way, the second terminal may merge the data carrying the first identifier and the data carrying the second identifier, it is thus possible to solve the problem of data loss due to the fact that the second terminal cannot merge the two data when it cannot know that the second identifier is the update of the first identifier, and to achieve the effect of improving the reliability of data transmission.

An exemplary embodiment of the disclosure provides a first terminal which may implement the method for updating an identifier provided by the disclosure. The access network device includes a processor and a memory storing signaling which is executable by the processor;

herein the processor is configured to:

acquire a second identifier during a process when the first terminal transmits data carrying a first identifier to a second terminal, where the second identifier is configured to update the first identifier, and both the first identifier and the second identifier are configured to identify the first terminal; and transmit indication information to the second terminal, where the indication information is configured to indicate that the second identifier carried in data transmitted subsequently by the first terminal to the second terminal is an update of the first identifier.

An exemplary embodiment of the disclosure provides a second terminal which may implement method for updating an identifier provided by the disclosure. The terminal includes a processor and a memory storing signaling which is executable by the processor;

herein the processor is configured to:

receive indication information transmitted by a first terminal during a process when the second terminal receives data carrying a first identifier from the first terminal, where the first identifier is configured to identify the first terminal; and determine, according to the indication information, that a second identifier carried in data transmitted subsequently by the first terminal is an update of the first identifier, where the second identifier is configured to the first terminal.

Figure 12:
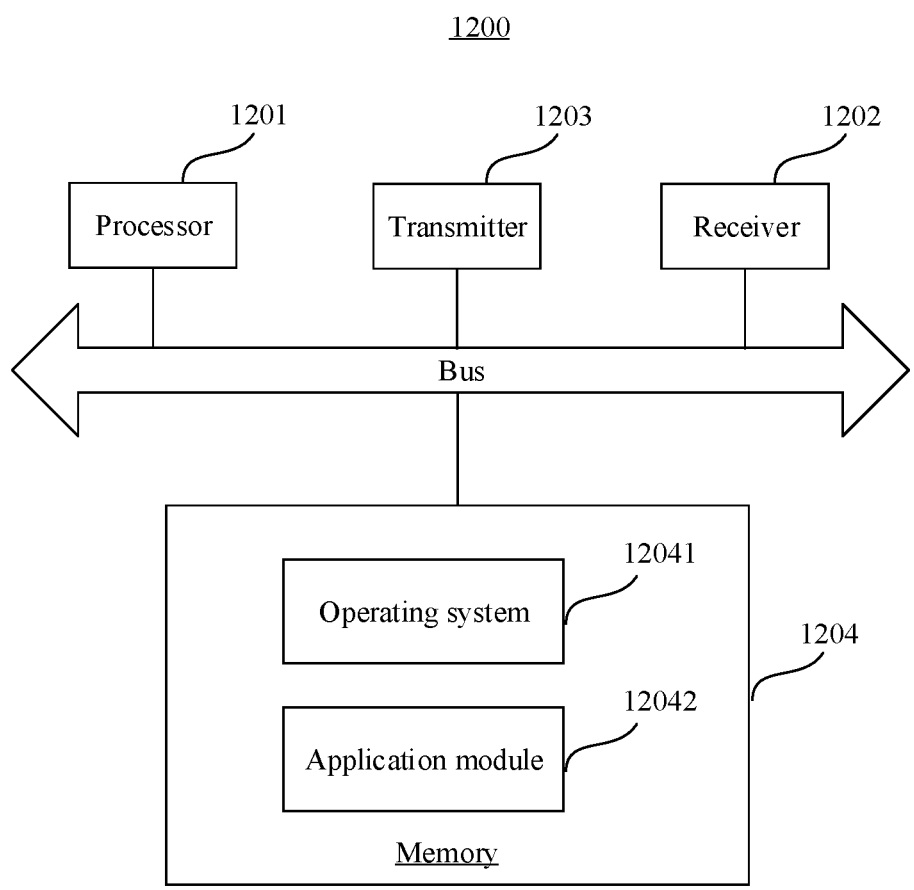
FIG. 12 is a block diagram showing a terminal according to an exemplary embodiment.

FIG. 12 is a block diagram showing a terminal according to an exemplary embodiment. For example, the terminal 1200 may be the first terminal or the second terminal. As shown in FIG. 12, the terminal 1200 may include a processor 1201, a receiver 1202, a transmitter 1203 and a memory 1204. The receiver 1202, the transmitter 1203 and the memory 1204 are connected to the processor 1201 through a bus respectively.

Herein, the processor 1201 includes one or more processing cores, and the processor 1201 executes the method executed by the first terminal or the second terminal in the method for updating an identifier provided by the embodiments of the disclosure by executing software programs and modules. The memory 1204 may store software programs and modules. Specifically, the memory 1204 may be configured to store an operating system 12041 and an application module 12042 required by at least one function. The receiver 1202 is configured to receive communication data transmitted by other devices, and the transmitter 1203 is configured to transmit communication data to other devices.

An exemplary embodiment of the disclosure provides a computer-readable storage medium having stored therein at least one instruction, at least one program segment, a code set or an instruction set that, when loaded and executed by a processor, cause the above method for updating an identifier to be performed.

Those skilled in the art will easily conceive of other embodiments of the disclosure after considering the description and practicing the disclosure herein. The disclosure is intended to cover any variations, usages or adaptive changes of the disclosure, and these variations, usages or adaptive changes follow the general principle of the disclosure and include common knowledge or conventional technical means in the technical field which are not disclosed in the disclosure. The description and the embodiments are considered as exemplary only, and the true scope and spirit of the disclosure are indicated by the appended claims.

It should be understood that the disclosure is not limited to the precise structure that has been described above and shown in the drawings, and various modifications and changes may be made without departing from the scope of the disclosure. The scope of the disclosure is limited by the appended claims only.

What is claimed is:

1. A method for updating an identifier, comprising:

during a process when a first terminal transmits data carrying a first identifier to a second terminal, acquiring, by the first terminal, a second identifier, wherein the second identifier is configured to update the first identifier, and both the first identifier and the second identifier are configured to identify the first terminal; and transmitting, by the first terminal, indication information to the second terminal, wherein the indication information is configured to indicate that the second identifier carried in data transmitted subsequently by the first terminal to the second terminal is an update of the first identifier.

2. The method of claim 1, wherein the indication information comprises the first identifier and the second identifier, and the first identifier and the second identifier are Media Access Control (MAC) layer identifiers, and wherein transmitting, by the first terminal, the indication information to the second terminal comprises:

generating, by the first terminal, an MAC Protocol Data Unit (PDU), wherein an MAC Control Element (CE) in the MAC PDU carries the second identifier, and an MAC subheader in the MAC PDU carries the first identifier;

encoding and modulating, by the first terminal, the MAC PDU to obtain data carrying the first identifier and the second identifier; and transmitting, by the first terminal, the data carrying the first identifier and the second identifier to the second terminal.

3. The method of claim 1, wherein the indication information comprises the first identifier and the second identifier, and the first identifier and the second identifier are physical (PHY) layer identifiers, and wherein the transmitting, by the first terminal, the indication information to the second terminal comprises:

generating, by the first terminal, an MAC PDU, wherein an MAC Control Element (CE) in the MAC PDU carries the second identifier;

encoding and modulating, by the first terminal, the first identifier and the MAC PDU to obtain data carrying the first identifier and the second identifier; and transmitting, by the first terminal, the data carrying the first identifier and the second identifier to the second terminal.

4. The method of claim 1, wherein the indication information comprises the first identifier and the second identifier, the first identifier comprises a first MAC layer identifier and a first PHY layer identifier, the second identifier comprises a second MAC layer identifier and a second PHY layer identifier, the second MAC layer identifier is configured to update the first MAC layer identifier and the second PHY layer identifier is configured to update the first PHY layer identifier, and wherein transmitting, by the first terminal, the indication information to the second terminal comprises:

generating, by the first terminal, an MAC PDU, wherein an MAC CE in the MAC PDU carries the second MAC layer identifier, another MAC CE in the MAC PDU carries the second PHY layer identifier, and an MAC subheader in the MAC PDU carries the first MAC layer identifier;

encoding and modulating, by the first terminal, the first PHY layer identifier and the MAC PDU to obtain data carrying the first identifier and the second identifier; and transmitting, by the first terminal, the data carrying the first identifier and the second identifier to the second terminal.

5. The method of claim 1, wherein the indication information comprises the first identifier, the second identifier and an effective time configured to indicate a time when the first terminal starts to transmit data carrying the second identifier, and wherein transmitting, by the first terminal, the indication information to the second terminal comprises:

broadcasting, by the first terminal, the first identifier, the second identifier and the effective time.

6. The method of claim 1, wherein the indication information comprises the first identifier and the second identifier, and wherein transmitting, by the first terminal, the indication information to the second terminal comprises:

broadcasting, by the first terminal, the first identifier and the second identifier;

wherein an effective time is pre-stored in the second terminal, and the effective time is configured to indicate a time when the first terminal starts to transmit data carrying the second identifier.

7. The method of claim 5 or 6, wherein the first identifier and the second identifier are MAC layer identifiers; or, the first identifier and the second identifier are PHY layer identifiers; or, the first identifier comprises a first MAC layer identifier and a first PHY layer identifier, and the second identifier comprises a second MAC layer identifier and a second PHY layer identifier, wherein the second MAC layer identifier is configured to update the first MAC layer identifier, and the second PHY layer identifier is configured to update the first PHY layer identifier.

8. A method for updating an identifier, comprising:

during a process when a second terminal receives data carrying a first identifier and transmitted by a first terminal, receiving, by the second terminal, indication information transmitted by the first terminal, wherein the first identifier is configured to identify the first terminal; and determining, by the second terminal according to the indication information, that a second identifier carried in data transmitted subsequently by the first terminal is an update of the first identifier, wherein the second identifier is configured to identify the first terminal.

9. The method of claim 8, wherein the indication information comprises the first identifier and the second identifier, and the first identifier and the second identifier are Media Access Control (MAC) layer identifiers, and the receiving, by the second terminal, the indication information transmitted by the first terminal comprises:

receiving, by the second terminal, data carrying the first identifier and the second identifier from the first terminal;

demodulating and decoding, by the second terminal, the data carrying the first identifier and the second identifier to obtain an MAC Protocol Data Unit (PDU); and acquiring, by the second terminal, the second identifier from an MAC Control Element (CE) in the MAC PDU, and acquiring, by the second terminal, the first identifier from an MAC subheader in the MAC PDU.

10. The method of claim 8, wherein the indication information comprises the first identifier and the second identifier, and the first identifier and the second identifier are physical (PHY) layer identifiers, and the receiving, by the second terminal, the indication information transmitted by the first terminal comprises:

receiving, by the second terminal, data carrying the first identifier and the second identifier from the first terminal;

demodulating and decoding, by the second terminal, the data carrying the first identifier and the second identifier to obtain the first identifier and an MAC PDU; and acquiring, by the second terminal, the second identifier from an MAC CE in the MAC PDU.

11. The method of claim 8, wherein the indication information comprises the first identifier and the second identifier, the first identifier comprises a first MAC layer identifier and a first PHY layer identifier, and the second identifier comprises a second MAC layer identifier and a second PHY layer identifier, the second MAC layer identifier is configured to the first MAC layer identifier, and the second PHY layer identifier updates the first PHY layer identifier, and the receiving, by the second terminal, the indication information transmitted by the first terminal comprises:

receiving, by the second terminal, data carrying the first identifier and the second identifier from the first terminal;

demodulating and decoding, by the second terminal, the data carrying the first identifier and the second identifier to obtain the first PHY layer identifier and an MAC PDU; and acquiring, by the second terminal, the second MAC layer identifier from an MAC CE in the MAC PDU, and acquiring, by the second terminal, the second PHY layer identifier from another MAC CE in the MAC PDU, and acquiring, by the second terminal, the first MAC layer identifier from an MAC subheader in the MAC PDU.

12. The method of claim 8, wherein the indication information comprises the first identifier, the second identifier and an effective time configured to indicate a time when the first terminal starts to transmit data carrying the second identifier, and the receiving, by the second terminal, the indication information transmitted by the first terminal comprises:

receiving, by the second terminal, the first identifier, the second identifier and the effective time broadcast by the first terminal.

13. The method of claim 8, wherein the indication information comprises the first identifier and the second identifier, and the receiving, by the second terminal, the indication information transmitted by the first terminal comprises:

receiving, by the second terminal, the first identifier and the second identifier broadcast by the first terminal; and acquiring, by the second terminal, a pre-stored effective time, wherein the effective time indicates a time when the first terminal starts to transmit data carrying the second identifier.

14. The method of claim 12 or 13, wherein the first identifier and the second identifier are MAC layer identifiers; or, the first identifier and the second identifier are PHY layer identifiers; or, the first identifier comprises a first MAC layer identifier and a first PHY layer identifier, and the second identifier comprises a second MAC layer identifier and a second PHY layer identifier, the second MAC layer identifier is configured to the first MAC layer identifier, and the second PHY layer identifier is configured to the first PHY layer identifier.

15. An apparatus for updating an identifier, comprising:

a processor;

memory storing instructions executable by the processor, wherein the processor is configured to:

acquire a second identifier during a process when a first terminal transmits data carrying a first identifier to a second terminal, wherein the second identifier is configured to update the first identifier, and both the first identifier and the second identifier are configured to identify the first terminal; and transmit indication information to the second terminal, wherein the indication information is configured to indicate that the second identifier carried in data transmitted subsequently by the first terminal to the second terminal is an update of the first identifier.

16. The apparatus of claim 15, wherein the indication information comprises the first identifier and the second identifier, and the first identifier and the second identifier are Media Access Control (MAC) layer identifiers, and wherein the processor is further configured to:

generate an MAC Protocol Data Unit (PDU), an MAC Control Element (CE) in the MAC PDU carries the second identifier, and an MAC subheader in the MAC PDU carries the first identifier;

encode and modulate the MAC PDU to obtain data carrying the first identifier and the second identifier; and transmit the data carrying the first identifier and the second identifier to the second terminal.

17. The apparatus of claim 15, wherein the indication information comprises the first identifier and the second identifier, and the first identifier and the second identifier are physical (PHY) layer identifiers, and wherein the processor is further configured to:

generate an MAC PDU, wherein an MAC Control Element (CE) in the MAC PDU carries the second identifier;

encode and modulate the first identifier and the MAC PDU to obtain data carrying the first identifier and the second identifier; and transmit the data carrying the first identifier and the second identifier to the second terminal.

18. The apparatus of claim 15, wherein the indication information comprises the first identifier and the second identifier, the first identifier comprises a first MAC layer identifier and a first PHY layer identifier, and the second identifier comprises a second MAC layer identifier and a second PHY layer identifier, the second MAC layer identifier is configured to the first MAC layer identifier, and the second PHY layer identifier is configured to the first PHY layer identifier, and the processor is further configured to:

generate an MAC PDU, an MAC CE in the MAC PDU carries the second MAC layer identifier, another MAC CE in the MAC PDU carries the second PHY layer identifier, and an MAC subheader in the MAC PDU carries the first MAC layer identifier;

encode and modulate the first PHY layer identifier and the MAC PDU to obtain data carrying the first identifier and the second identifier; and transmit the data carrying the first identifier and the second identifier to the second terminal.

19. The apparatus of claim 15, wherein the indication information comprises the first identifier, the second identifier and an effective time configured to indicate a time when the first terminal starts to transmit data carrying the second identifier, and wherein the processor is further configured to:

broadcast the first identifier, the second identifier and the effective time.

20. An apparatus for updating an identifier implementing the method of claim 8, comprising:
   a processor;
   memory storing instructions executable by the processor, wherein the processor is configured to perform steps of the method.

\* \* \* \* \*